United States Patent [19]

Furuse

[11] Patent Number: 4,675,834
[45] Date of Patent: Jun. 23, 1987

[54] PRESSURE VARIATION DETECTING TYPE LEAKAGE INSPECTION SYSTEM WITH TEMPERATURE COMPENSATION

[75] Inventor: Kiyoshi Furuse, Hino, Japan

[73] Assignee: Kabushiki Kaisha Kosumo Keiki, Tokyo, Japan

[21] Appl. No.: 694,448

[22] PCT Filed: May 10, 1984

[86] PCT No.: PCT/JP84/00237

§ 371 Date: Dec. 21, 1984

§ 102(e) Date: Dec. 21, 1984

[30] Foreign Application Priority Data

May 11, 1983 [JP] Japan ................................ 58-80944

[51] Int. Cl.$^4$ ....................... G01M 3/32; G01K 13/00; G01K 19/00
[52] U.S. Cl. .................................. 364/558; 364/557; 73/49.2; 73/52; 374/4
[58] Field of Search ............... 364/479, 558, 550, 580, 364/571, 557, 150, 151, 176, 503; 73/49.2, 49.3, 52; 374/4

[56] References Cited

U.S. PATENT DOCUMENTS

| | | | |
|---|---|---|---|
| 3,504,528 | 4/1970 | Weinberg et al. | 73/49.3 |
| 4,192,005 | 3/1980 | Kurtz | 364/558 |
| 4,193,118 | 3/1980 | Nash et al. | 364/734 |
| 4,226,125 | 10/1980 | Waugh | 73/708 |
| 4,272,985 | 6/1981 | Rapson, Jr. et al. | 73/49.2 |
| 4,490,800 | 12/1984 | Powers | 364/558 |
| 4,571,986 | 2/1986 | Fujii et al. | 73/49.1 |
| 4,587,619 | 5/1986 | Converse, III et al. | 364/558 |

FOREIGN PATENT DOCUMENTS

| | | |
|---|---|---|
| 58-50445 | 3/1983 | Japan. |
| 58-171441 | 11/1983 | Japan. |
| 58-180680 | 11/1983 | Japan. |
| 59-0669 | 1/1984 | Japan. |
| PCT/JP83/0-85 | 3/1984 | Japan. |

Primary Examiner—Gary Chin
Assistant Examiner—Daniel W. Juffernbruch
Attorney, Agent, or Firm—Pollock, Vande Sande and Priddy

[57] ABSTRACT

A temporal variation in a fluid pressure of a fixed value applied to an article under inspection, or in the differential pressure between it and a fluid pressure applied to a comparison tank, is measured, and the measured value is compared with a reference value, thereby judging whether the airtightness of the article under inspection is good. Of the measured pressure or differential pressure data, data on the inspected articles judged non-defective are stored, by a predetermined number, in accordance with individual temperature differences between them and the comparison tank, or temperature differences between them a reference temperature, and a mean value of the stored data is calculated for each temperature difference. This mean value is used as a correction value for correcting, for each temperature difference, the measured pressure or differential pressure data on articles subsequently inspected.

6 Claims, 7 Drawing Figures

PRIOR ART
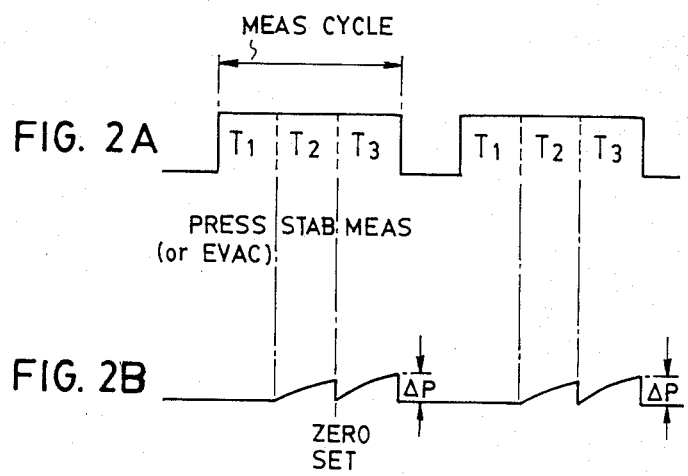
FIG. 2A
FIG. 2B
PRIOR ART
FIG. 3A
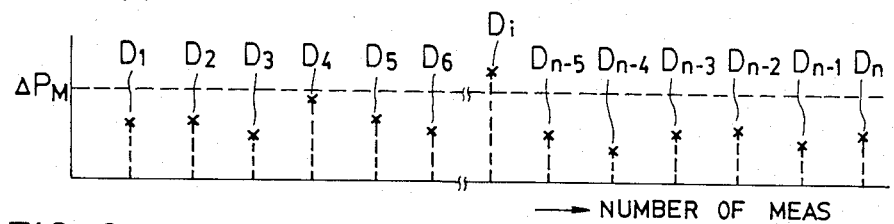
FIG. 3B
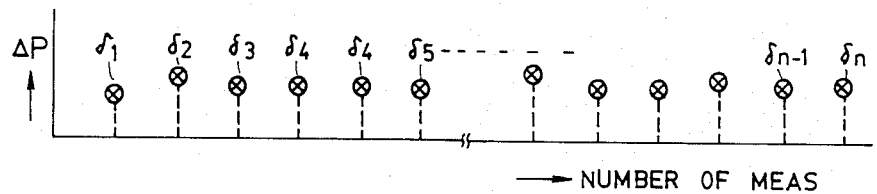
FIG. 3C
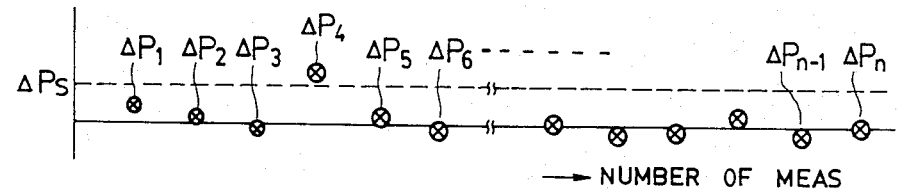

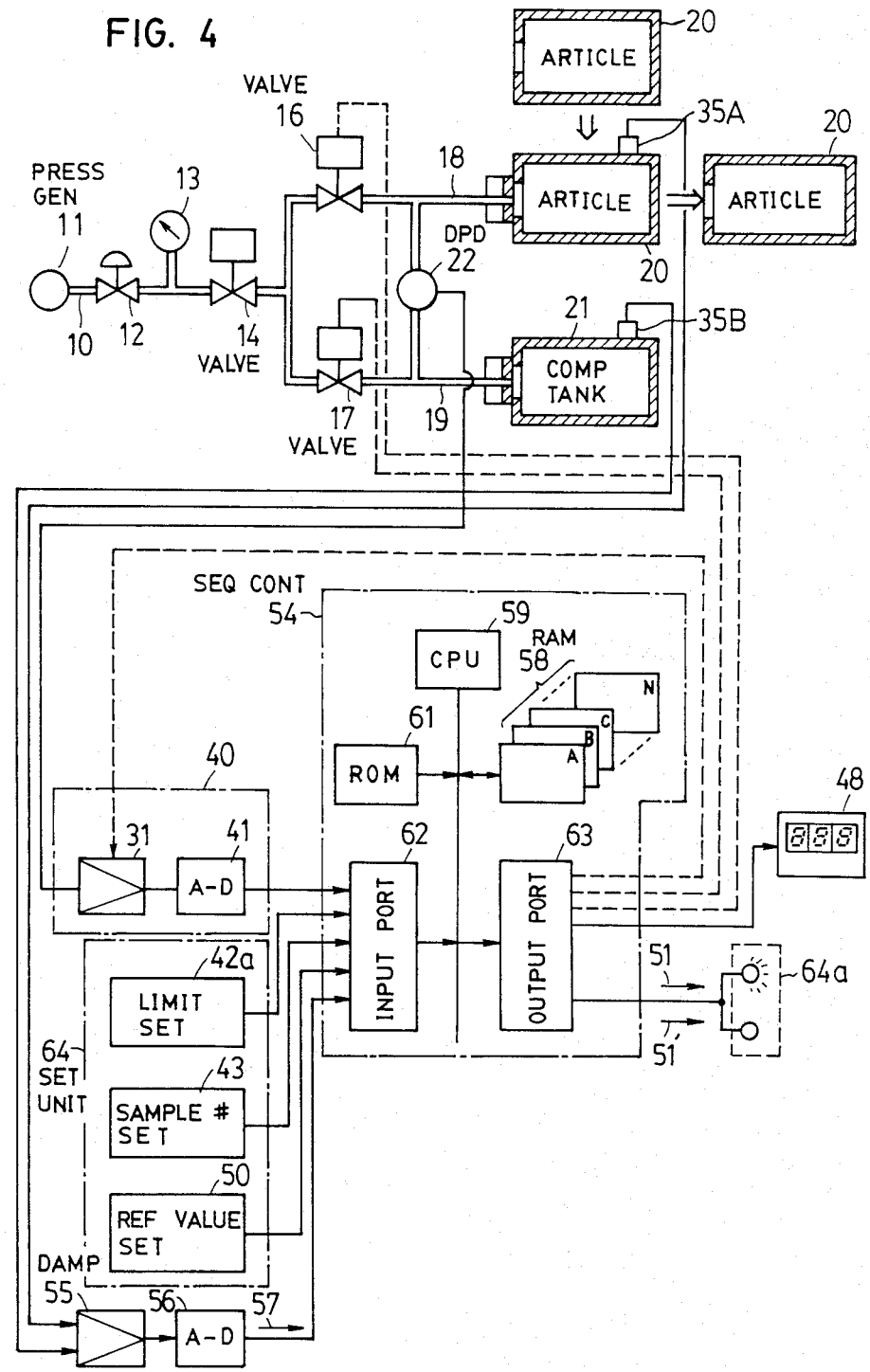

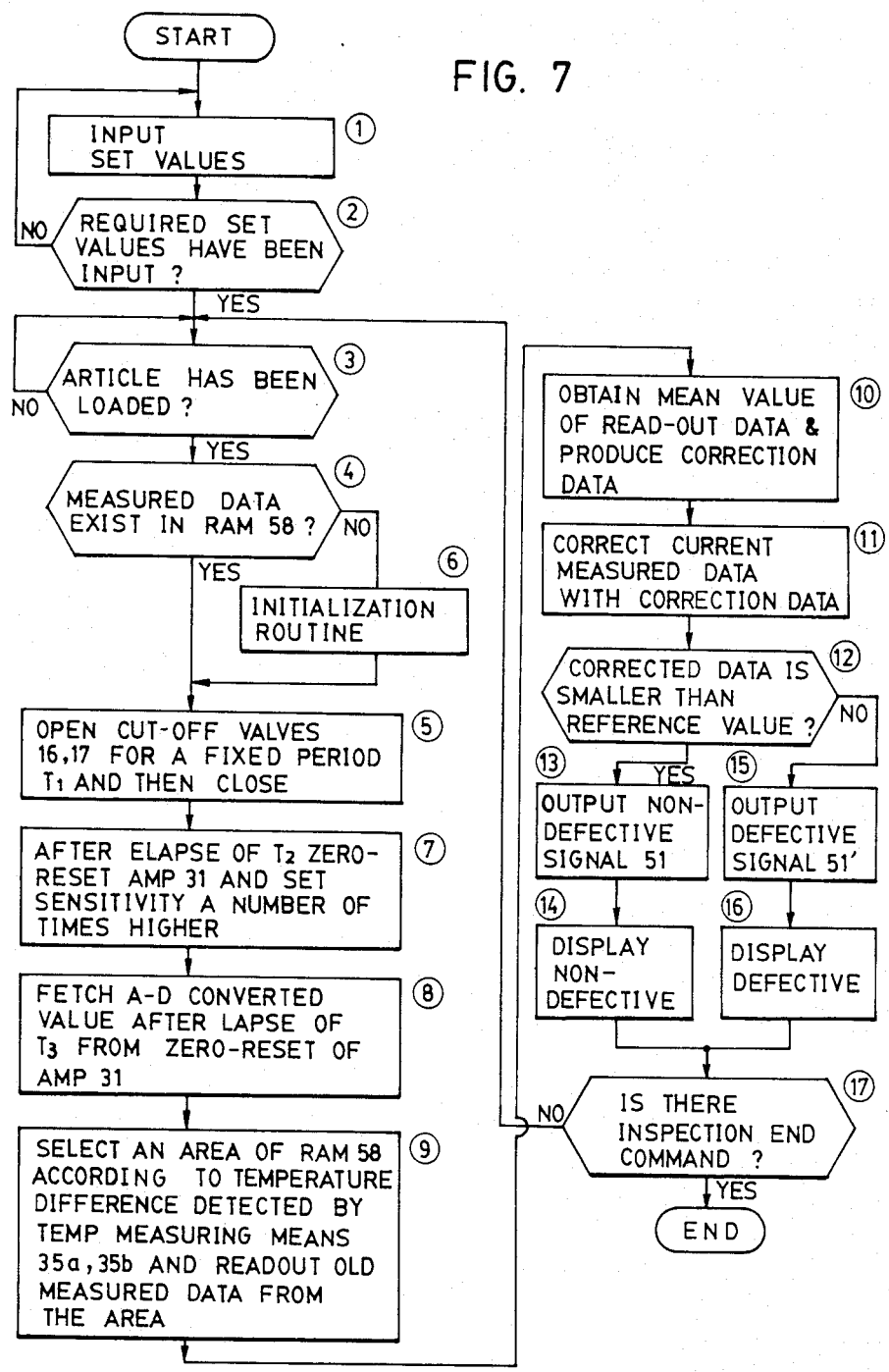

PRESSURE VARIATION DETECTING TYPE LEAKAGE INSPECTION SYSTEM WITH TEMPERATURE COMPENSATION

CROSS REFERENCE TO RELATED APPLICATIONS

The subject matter of the present application is related to applicant's prior copending applications Ser. No. 666,082 filed Oct. 29, 1984, for "Leakage Inspection Method", and Ser. No. 674,908 filed Nov. 9, 1984, for "Pressure Variation Detecting Type Leakage Inspection Equipment".

TECHNICAL FIELD

The present invention relates to leakage inspection equipment by which products or parts which are required to be free from a fluid leak or to limit a fluid leak within a prescribed range while in use, such as instruments or containers handling fluids, are inspected one after another in their production process to judge whether they are non-defective or defective.

BACKGROUND ART

Various instruments such as an engine cylinder, a container of a waterproof watch, a gas appliance and so forth are required to be completely free from a gas or liquid leak or to suppress the leakage within a specified limit. To meet this requirement, such instruments or parts are checked for leakage in their manufacturing process.

As leakage inspection equipments for such a leakage test, pressure variation detecting type leakage inspection equipments have already been put to practical use. The leakage inspection equipments of this type can be roughly divided into two types of inspection systems, one of which applies a positive or negative fluid pressure to the interior of an article under inspection and detects whether a change in the pressure is within a prescribed range, thereby judging whether the article under inspection is non-defective or defective, and the other of which applies a positive or negative fluid pressure to each of the articles under inspection and a comparison tank and measures a variation in the differential pressure therebetween, thereby judging whether the article under inspection is non-defective or defective.

In either system, a fluid pressure is applied to the article under inspection, a variation in the pressure or differential pressure is monitored for a certain period of time after the fluid pressure reached a predetermined value, and the article being inspected is judged non-defective or defective depending upon whether the variation in the pressure or differential pressure is within a prescribed range. In such an inspection, air is usually employed as the fluid. In the case of using pneumatic pressure as the fluid pressure, an error may be introduced into the measured pressure value or differential pressure value owing to various factors such as the temperature of the article under inspection, ambient temperature, humidity, water content adhering to the article under inspection and its slight deformation by pressure.

If the error value is always constant, no particular trouble occurs since it is necessary only to hold the reference value for judgement constant. Since the error contained in the pressure or differential pressure value is caused by the abovesaid various factors, however, a change in each factor incurs a variation in the error value. Accordingly, in the case of continuously performing the inspection, it is necessary that the reference value for judgement be frequently modified in response to variations in the error value.

As a method for automatically changing the reference value in response to variations in the error value, the present applicant has previously proposed pressure variation detecting type leakage inspection equipment (PCT/JP 83/00085) in applicant's prior copending U.S. application Ser. No. 674,908.

The pressure variation detecting type leakage inspection equipment proposed in said U.S. application Ser. No. 674,908 is provided with a memory for storing a predetermined number of measured data on inspected articles judged non-defective, calculating means for calculating a mean value of the measured data stored in the memory and data correcting means for correcting measured data through using the mean value, obtained by the calculating means, as a correction value for the measured data on the article being inspected, and is adapted so that by utilizing a moving mean of a plurality of preceding measured data as a correction value, the tendency of variation in an error value resulting from various factors is detected, ensuring automatic correction of variations in the error value.

With this previously proposed pressure variation detecting type leakage inspection equipment, even if the error value varies owing to various factors, the correction value is automatically corrected in response to the variation in the error value. As a result of this, an appropriate correction value can always be obtained and the leakage inspection equipment can be automated.

TECHNICAL PROBLEMS

In checking articles for leakage in their actual production process, they often differ in temperature. The reason for this is that when the articles are subjected to the leakage inspection after being thermally shocked by a high-temperature cleaning step or welding step prior to the inspection, they are mostly within a certain range of temperature, but some of them are occasionally out of the range.

When checking articles of different temperatures, the pneumatic pressure varies with temperature, resulting in the measured data value differing for each temperature.

In the case where such articles of different temperatures are inspected by the previously proposed pressure variation detecting type leakage inspection equipment, if measured data is obtained which greatly deviates from the mean value of previous measured data stored for obtaining the correction value, there is the possibility of judging the article defective even if it is non-defective.

An object of the present invention is to provide pressure variation detecting type leakage inspection equipment with which it is possible to accurately judge whether articles of different temperature are non-defective or defective.

DISCLOSURE OF THE INVENTION

The pressure variation detecting type leakage inspection equipment of the present invention is comprised of a temperature measuring unit for comparing the temperature of an article being inspected and a reference temperature to detect the temperature difference therebetween, a memory capable of sorting measured data according to the temperature difference and storing a plurality of sorted previous measured data, an arithmetic unit for reading out measured data corresponding to the temperature difference and computing their mean value, a correction unit for correcting measured data on an article being inspected by using, as a correction value, the mean value computed by the arithmetic unit, and a judgement unit for comparing the corrected data with a reference value to judge whether the article under inspection is non-defective or defective.

With this arrangement, it is possible to prepare appropriate correction values for articles under inspection which are of different temperatures, thereby making it possible to accurately judge whether they are non-defective or defective.

BRIEF DESCRIPTION OF THE DRAWINGS

FIGS. 2A, 2B and 3A-3C are timing charts explanatory of the operation of the leakage inspection equipment shown in FIG. 1; FIG. 4 is a block diagram explanatory of an embodiment of the present invention; FIG. 7 is a flowchart explanatory of the sequence of operation of the leakage inspection equipment of the present invention.

BEST MODE FOR CARRYING OUT THE INVENTION

Figure 1:
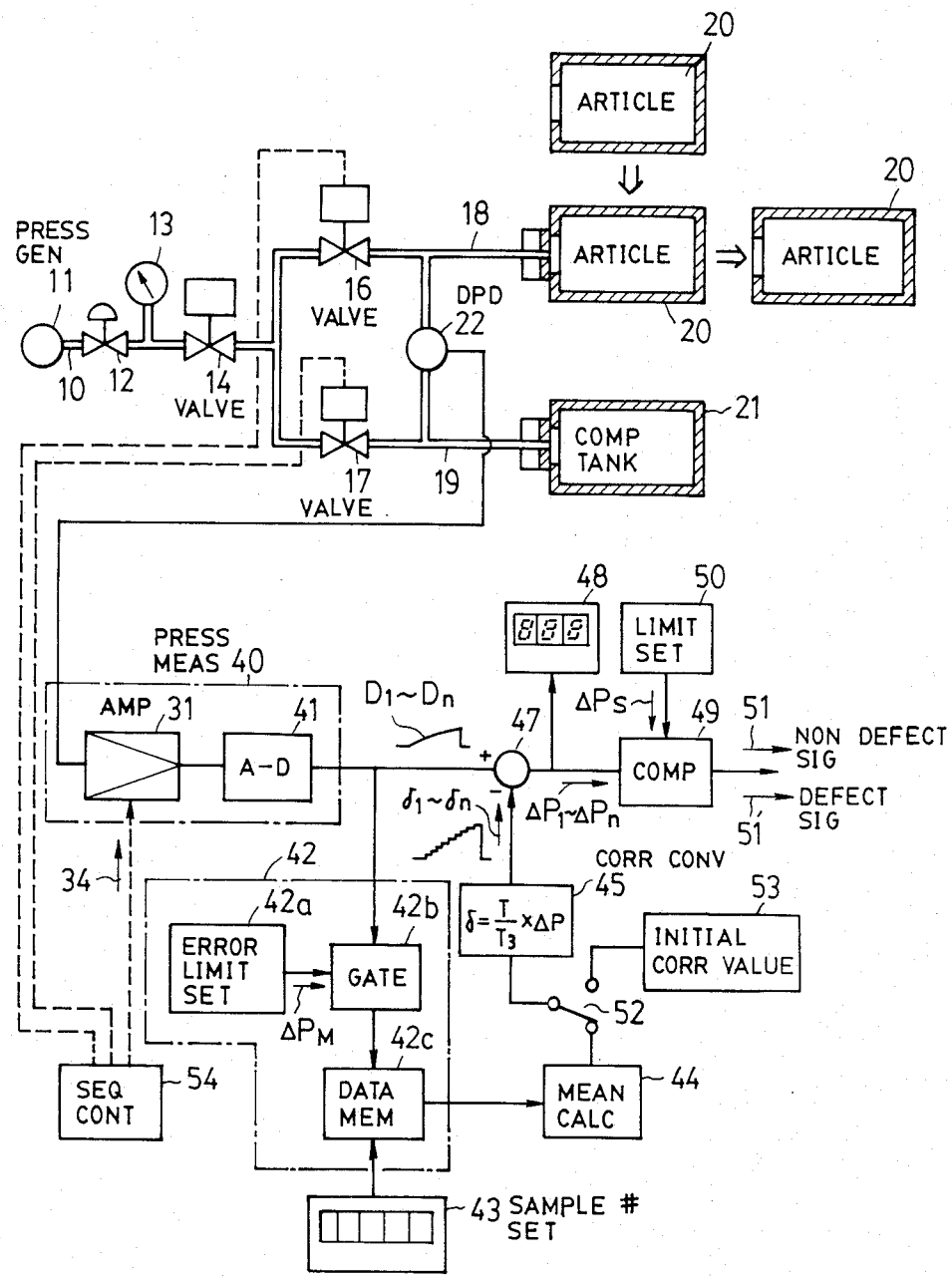
FIG. 1 is a block diagram explanatory of conventional leakage inspection equipment.

FIG. 1 is a block diagram illustrating the arrangement of the pressure variation detecting type leakage inspection equipment having a temperature compensating function, proposed previously in (PCT/JP 83/00085); U.S. application Ser. No. 674,908. This example will be described in connection with a system of detecting a differential pressure variation. In FIG. 1, reference numeral 11 indicates a fluid pressure generator which generates a positive or negative pressure, such as a pneumatic pressure source or exhaust system. A flow tube 10 is connected to the output side of the fluid pressure generator 11. The flow tube 10 is connected to a regulating valve 12 and an electromagnetic valve 14 and, at the outlet side of the electromagnetic valve 14, is divided into two branch pipes 18 and 19. Connected between the outlet of the regulating valve 12 and the inlet of the electromagnetic valve 14 is a pressure gauge 13 for setting and indicating a checking pressure.

A cut-off valve 16 is connected to the branch pipe 18, and a load/unload mechanism is provided by which an article 20 to be checked for leakage is connected to the outlet side of the cut-off valve 16. With this load/unload mechanism, articles 20 to be checked can be connected to the equipment one after another for leakage inspection.

On the other hand, another cut-off valve 17 is connected to the branch pipe 19 and a comparison tank 21 is connected to the outlet side of the cut-off valve 17. A differential pressure detector 22 is connected between the branch pipes 18 and 19 at the side of the outlets of the cut-off valves 16 and 17.

An output terminal of the differential pressure detector 22 is connected to an input terminal of an automatic zero adjustment type amplifier 31. The differential pressure detector 22, the amplifier 31 and an A-D converter 41 constitute a pressure measuring unit 40. An output terminal of the A-D converter 41 is connected via a data correction part 47 to an output display 48 and an input terminal of a comparison part 49.

Pressure Measuring Operation

The pressure measuring operation is performed in the manner depicted in FIG. 2. After the article 20 to be checked is attached to the end of the branch pipe 18 and the leak-free comparison tank 21 is attached to the branch pipe 19, the electromagnetic valve 14 is closed and the regulating valve 12 is opened and controlled so that the pneumatic pressure from the fluid pressure source 11 may assume a predetermined value on the pressure gauge 13. Next, the cut-off valves 16 and 17 are opened and the electromagnetic valve 14 is opened, supplying the fluid (air) of the fixed pressure to the article 20 and the comparison tank 21 via the branch pipes 18 and 19, respectively. This period of operation will hereinafter be referred to as a pressurization or evacuation period, which is indicated by $T_1$ in FIG. 2A.

When the pressures in the article 20 under inspection and the comparison tank 21 have settled down with the lapse of the fixed time $T_1$ after the cut-off valves 16 and 17 were opened, the cut-off valves 16 and 17 are closed. Further, after the lapse of a predetermined time $T_2$ shown in FIG. 2A (which time $T_2$ will hereinafter be referred to as a stabilization period), a zero adjustment signal 34 is applied from a sequence controller 54 to the automatic zero adjustment type amplifier 31 connected to the differential pressure detector 22, by which the output of the amplifier 31 is preset to zero as shown in FIG. 2B, and a certain period of time $T_3$ after the zero setting, the output signal of the amplifier 31 is read out. The period of time $T_3$ from the zero setting time point to the readout of the amplifier output is shown in FIG. 2A and will hereinafter be referred to as the measurement period. When the amplifier 31 is set to zero, the amplifier 31 is switched to its high-sensitivity state. Accordingly, when the output of the amplifier 31 is read out, a detection signal of the differential pressure detector 22 is amplified for readout.

A sequence consisting of the period $T_1$ in which to open the cut-off valves 16 and 17 for pressurization, the period $T_2$ in which to close the cut-off valves 16 and 17 for pressure stabilization, and the measurement period $T_3$ to set the amplifier 31 to zero for readout of its output, will hereinafter be referred to as a measurement cycle. The switching of the periods $T_1$, $T_2$ and $T_3$ is effected by the sequence controller 54.

Description on Processing of Pressure Measured Data

The output of the A-D converter 41 is supplied to a memory 42. The memory 42 comprises error upper-limit setting means 42a, a gate 42b which permits the passage therethrough of measured pressure data when the output value of the A-D converter 41 is smaller than an error upper-limit value $\Delta P_M$ set in the setting means 42a and when it is judged in the comparison part 49 that the article being inspected is non-defective and which inhibits the passage therethrough of measured pressure data when the output data of the A-D converter 41 is larger than the error upper-limit value $\Delta P_M$ and when it is judged in the comparison part 49 that the article under inspection is defective, and a data memory 42c for storing only the measured pressure data that has passed through the gate 42b. Consequently, the data memory 42c stores error data only in the case where the measured pressure data is smaller than the error upper-limit value $\Delta P_M$ set in the setting means 42a and the comparison part 49 judges that the article being inspected is non-defective.

A predetermined number of the measured pressure data stored in the data memory 42c are read out therefrom in accordance with the number of data set in a sample-number setting means 43 and are provided to a mean value calculation part 44.

The mean value calculation part 44 calculates a mean value of previous measured pressure data provided from the data memory 42c and supplies the mean value via a change-over switch 52 to a correction value converting part 45. The correction value converting part 45 calculates a correction value $\delta = T/T_3 \times \Delta P$ on the basis of, for example, the measurement period $T_3$ and the mean error value $\Delta P$ supplied from the mean value calculation part 44, T being an elapsed time and assumed to vary from 0 to $T_3$. By this calculation, the correction value converting part 45 provides the correction value $\delta$ as a digital code which gradually increases from $\delta = 0$ to $\delta = \Delta P$ with the lapse of time T. The correction value $\delta$ is applied to the data correction part 47 for correcting measured data $\Delta Pi$ from the D-A converter 41.

At the input side of the correction value converting part 45, initial correction value setting means 53 is provided in addition to the mean value calculation part 44. Only for first measurement immediately after the start of operation, the measured data is corrected by a correction value set in the initial correction value setting means 53, and for each subsequent measurement, a mean value of the measured data is used as a correction value. The mean value is obtained by averaging measured data of the number of samples set in the sample-number setting means 43. That is, in the case of the number of samples being set to N, the current measured data and N preceding measured data are averaged. In the next measurement cycle, the oldest one of the N preceding measured data is removed but instead the immediately preceding measured data is added to the remaining data and their mean value is obtained. This is commonly referred to as a moving average. Until the number of measured pressure data stored in the data memory 42c reaches the N, a mean value of the number stored data is computed. A description will be given, with reference to FIG. 3, of the correcting operation. In FIG. 3A, $D_1, D_2, D_3, \ldots D_n$ are measured pressure data obtained in respective measurement cycles. Of the pressure measured data $D_1$ to $D_n$, for example, $D_i$ which exceeds the error upper-limit value $\Delta P_M$ is inhibited by the gate means 42b from passing therethrough, and hence is not stored in the data memory 42c. In FIG. 3B, $\delta_1$ to $\delta_n$ indicate correction values for correcting the measured pressure data $D_1$ to $D_n$, respectively.

The first correction value $\delta_1$ is provided from the initial correction value setting means 53, and the measured pressure data $D_1$ is corrected by the correction value $\delta_1$, obtaining corrected data $\Delta P_1$ shown in FIG. 3C. The corrected data $P_1$ is applied to the comparison part 49, wherein it is compared with a limit value $\Delta P_s$ from a judgement limit setting means 50. If the corrected data $\Delta P_1$ is within the limit, then a non-defective signal 51 is produced. The corrected data $\Delta P_1$ is also provided to the display 43, in addition to the comparison part 49, by which the corrected data value (a value corresponding to the differential pressure) is displayed.

In the second measurement cycle, the change-over switch 52 is connected to the side of the mean value calculation part 44. Since the data memory 42c has stored therein the first measured data value $D_1$ alone, this measured pressure data $D_1$ is used as the correction value $\delta_2$ for the second measured data $D_2$. In the third measurement, since the first and second measured data $D_1$ and $D_2$ are stored in the error storage 42c, the mean value calculation part 44 calculates the mean value $\delta_3$ of the measured pressure data $D_1$ and $D_2$, and the mean value $\delta_3$ is supplied to the correction value converting part 45 for correcting the third measured data $D_3$. If the corrected data $\Delta P_3$ is smaller than the limit value $\Delta P_s$, the comparison part 49 produces the non-defective signal 51.

In a similar manner, the measured pressure data $D_4$ is corrected by using the mean value $\delta_4$ of the measured data $D_1$, $D_2$ and $D_3$. As a result of this correction, corrected data $\Delta P_4$ is obtained, and if the data $\Delta P_4$ exceeds the limit value $\Delta P_s$, then the comparison part 49 produces a defective signal 51'. In this case, the measured data $D_4$ is not input into the memory 42c. Accordingly, the mean value $\delta_4$ is used again for the next measured data $D_5$.

When the measured data $D_i$ in a certain measurement cycle exceeds the correction limit value $\Delta P_M$ set in the correction limit setting means 42a, it is judged that there is an abnormal leakage somewhere other than the article under inspection, and the measured data is not input into the memory 42c.

As described above, according to the previously proposed pressure variation detecting type leakage inspection equipment, even if the error slightly varies owing to variations in ambient temperature or the like during inspection, the error variations are averaged for use as a correction value, ensuring that an appropriate correction is effected at all times. Accordingly, a high precision leakage test can be achieved continuously and automatically.

However, the above-described equipment adopts the arrangement that the measured pressure data only in the case of the article under inspection being judged non-defective is input into the memory 42. On account of this, the situation may sometimes arise, for example, where when the temperature of an article under inspection, though non-defective, is widely different from a normal value, and the article is judged defective since its measured data greatly differs from others. The present invention avoids this problem.

FIG. 4 illustrates an embodiment of the present invention. In FIG. 4, the parts corresponding to those in FIG. 1 are identified by the same reference numerals.

In the present invention, variations in the differential pressure between the article 20 under inspection and the comparison tank 21 are measured by the differential pressure detector 22, and at the same time, the temperatures of the article 20 under inspection and the comparison tank 21 are measured by temperature measuring means 35A and 35B held in contact therewith, respectively. The temperature measurement signals are provided to a differential amplifier 55, from which is detected the temperature difference between the article 20 being inspected and the comparison tank 21. The value of this temperature difference is converted by an A-D converter 56 into digital form, and the resulting digital signal 57 is applied to the sequence controller 54. In the sequence controller 54, one of a plurality of storage areas A, B, C ... N provided in a memory 58 is selected according to the temperature difference, and the pressure measured data is stored in the selected storage area.

In this example, a microcomputer is used as the sequence controller 54. The microcomputer is, as already well-known, made up of a central processor 59, a read only memory (hereinafter referred to simply as ROM) 61, a random access memory (hereinafter referred to simply as RAM) 58, an input port 62 and an output port 63.

The measured pressure data obtained by the pressure measuring means 40 and the temperature difference data 57 are provided to the input port 62, from which they are input into the central processor 59 alternately with each other at time intervals of, for example, about 10 milliseconds.

The input port 62 is supplied with various set values from a setting unit 64. The setting unit 64 is provided with the upper-limit value setting means 42a, the sample-number setting means 43 for setting the number of data to be read out of the RAM 58 for obtaining a correction value and the reference value setting means 50 for setting a reference value for judgement, and the respective set values are provided to the input port 62 from these setting means 42a, 43 and 50. In practice, these setting means 42a, 43 and 50 are each formed by a 10-key switch. In the case of inputting each set value, for example, a code representing each setting is entered to call, for instance, an upper-limit value setting routine from the ROM 61 and an upper-limit value is entered and stored in a part of the RAM 58. Also in the case of sample-number setting and reference value setting, respective set values are similarly stored in the RAM 58.

The output port 63 of the sequence controller 54 is supplied with control signals for the cut-off valves 16 and 17, a zero-reset signal and a sensitivity switching control signal for the amplifier 31 and the judgement signals 51 and 51'. The control signals are applied to the cut-off valves 16 and 17, controlling them to open and close in a predetermined order. This control sequence is stored as a program in the ROM 61, and the control is performed in accordance with the program.

Now, a description will be given of a method of inputting the measured pressure value into the RAM 58. The difference between the temperatures measured by the temperature measuring means 35a and 35b is detected by the differential amplifier 55. The temperature difference signal thus obtained by the differential amplifier 55 is applied to the A-D converter 56, by which it is converted to the digital signal 57. In this case, if resolution of the A-D conversion is set to, for example, 1° C., then the temperature difference signal is converted into the digital signal at intervals of 1° C. For instance, when the temperature difference is in the range of 0° C. to 0.5° C., the temperature difference is considered to be 0° C. and the storage area A of the RAM 58 is selected. When the temperature difference is in the range of 0.5° C. to 1.5° C., the temperature difference is considered to be 1° C. and the storage area B is selected. When the temperature difference is in the range of 1.6° C. to 2.5° C., the temperature difference is considered to be 2° C. and the storage area C is selected. Thus, in general, when the temperature difference is in the range of (N−0.5)°C. to (N+0.5)°C., the temperature difference is defined to be N°C. and the storage area N is selected. In this way, the storage areas of the RAM 58 are selectively controlled by the digital signal 57.

The storage areas A to N each has 20 to 30 addresses, and pressure measured values detected by the differential pressure detector 22 are sequentially stored as pressure measured data at the addresses.

That is, the measured pressure data is detected by the differential pressure detector 22 and provided via the amplifier 31 to the A-D converter 41, by which it is converted into a digital signal. This digital signal is input into the central processor 59 via the input port 62. The measured pressure data input into each storage area is written at the leading address of the storage area. When a new pressure measurement error value is written at the leading address, previously written measured pressure data are each shifted one address. In the case where the storage area is full, the oldest measured pressure value is discarded from the storage area.

The measured pressure data thus sorted according to the temperature of the article 20 under inspection and input into the RAM 58 is read out of the storage area corresponding to the temperature difference between the article 20 being inspected next and the comparison tank 21 when the article is inspected, and the mean value of the data is computed by the central processor 59 and then the current measured pressure value is corrected by using the computed mean value as the correction value. The corrected data is compared with the reference value for judgement, and if it is smaller than the reference value, then the non-defective signal 51 is produced and if it is larger than the reference value, then the defective signal 51' is produced. The result of the comparison is displayed on a display 64a.

When the defective signal 51' is produced, the measured pressure data supplied from the A-D converter 41 to the controller 54 is not written into the RAM 58. Further, data which exceeds the upper-limit set value $\Delta P_M$ is also inhibited from being loaded.

The sample-number setting means 43 permits the setting of the number of data which are read out of each of the storage areas A to N of the RAM 58 for obtaining the mean value.

Figure 5:
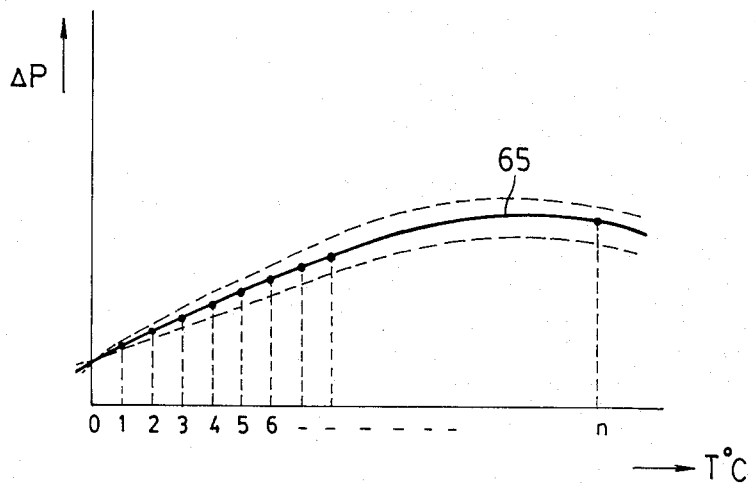
FIG. 5 is a graph explanatory of the operation of the present invention.

With the arrangement described above, the temperature of the article 20 being inspected (i.e. the difference between its temperature and the temperature of the comparison tank 21) is detected for each measurement, and the measured pressure data for each temperature is input as a measurement error value into the RAM 58. Each time the measured data is input, the oldest measured data is removed, and the measured data thus stored are averaged to obtain the correction value. Consequently, even if the temperature correction curve 65 slightly fluctuates as shown in FIG. 5, the measured data which is input into the RAM 58 also varies with its fluctuation. Accordingly, even if the temperature compensation curve 65 varies, the correction value is automatically modified, ensuring to achieve a correct temperature compensation at all times.

Description on the Start of Measurement

Incidentally, at the time of starting the measurement after installation of the equipment, there is no measurement error value in the RAM 58. The start of measurement from such a state is effected in the following manner.

Figure 6:
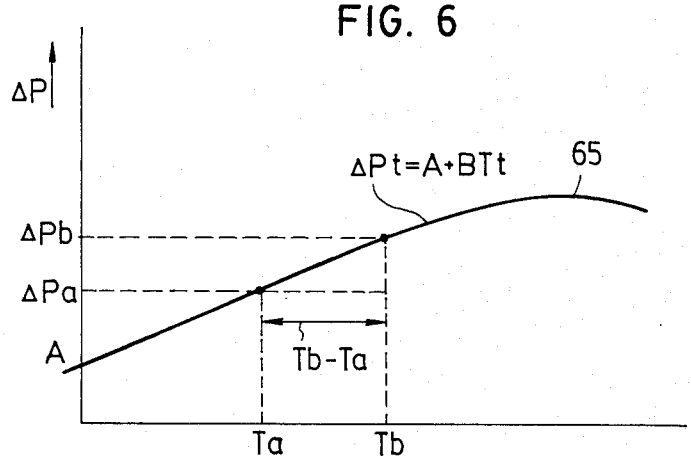
FIG. 6 is a graph explanatory of an initial operation of the leakage inspection equipment of the present invention.

In the event that any measured pressure data does not exist at all in the RAM 58, the correction value for correcting the current measured data is zero. Therefore, at the start of measurement, non-defective articles are prepared as the articles 20 and only the non-defective articles are measured so that their measured data are input into the RAM 58. Incidentally, even if non-defective articles are not prepared, the fraction of defective products is generally small. Accordingly, even if products flowing on an ordinary production line are measured as they are, each product can be regarded as substantially non-defective. Therefore, even if no measured pressure data is stored in the RAM 58 for each temperature, the articles under test may be measured as non-defective ones. Assume that the temperature of an article being inspected first is Ta as shown in FIG. 6. A measured pressure value obtained with the article of the temperature Ta is written, as pressure measured data ΔPa, into one of the storage areas of the RAM 58. When the temperature of the second article being inspected is equal to the temperature Ta of the first article, its measured pressure value is input into the above storage area. If, however, the temperature Tb of the second article under inspection is not equal to the temperature Ta, its measured pressure value ΔPb is written, as measured data, into a storage area corresponding to the temperature Tb.

When the measured pressure data ΔPa and ΔPb on the articles of different temperatures are loaded as described above, pseudo-measured data for temperatures other than those Ta and Tb are computed by an estimative calculation by the central processor 59, for the subsequent inspection, according to the following expressions:

$$\Delta Pt = A + BTt \qquad (1)$$

$$A = \Delta Pa - BTa \qquad (2)$$

$$B = \frac{\Delta Pb - \Delta Pa}{Tb - Ta} \qquad (3)$$

The pseudo-measured data is computed by the above expressions, as first measured data for each temperature other than the measured ones Ta and Tb, and each measured data is written into the storage area for each temperature. This estimative calculation is applied to the first measurement alone for each temperature, and the result of calculation is written, as pseudo-measured data, at the leading address of each of the storage areas A to N corresponding to the respective temperatures. Thereafter the thus input pseudo-measured data is used as correction data and the succeeding measured pressure data are sequentially stored as measured data in the respective storage areas. After two or more data are stored in the respective storage areas A to N, mean values of the data in the storage areas A to N are used as correction data for the subsequent measurement.

The above operation will be described with regard to a flowchart shown in FIG. 7.

In step (1) respective set values are input. In step (2) it is checked whether required set values have been input, and if not, the process returns to step (1) to demand the inputting of the required set values. In step (3) it is checked whether the article to be inspected 20 has been mounted on the load/unload mechanism. When the article 20 has already been loaded, the process proceeds to step (4). In step (4) it is checked whether previous measured data exist in the RAM 58. If not, the process enters into an initialization routine (6), in which when two articles of different temperatures are inspected, the calculations of the aforementioned first, second and third expressions are carried out to obtain pseudo-measured data for each temperature.

In the case of the RAM 58 having stored therein previous measured data and in the initialization routine (6), when the pseudo-measured data is obtained for each temperature, the process proceeds to step (5), starting normal measurement. That is, in step (5) the cut-off valves 16 and 17 are controlled to open for the fixed period of time $T_1$, applying the fluid pressure to the article under inspection 20 and the comparison tank 21. In step (7), after the elapse of time $T_2$, the amplifier 31 is reset to zero and its sensitivity is switched to a state that is a predetermined number of times higher than in the normal state.

In step (8), when the time $T_3$ has passed after the zero-resetting of the amplifier 31, the A-D converted value from the A-D converter 41 is input as measured pressure data. In step (9) one of the areas of the RAM 58 is selected according to the temperature difference detected by the temperature measuring means 35a and 35b and the old measured data are read out of the selected area by the set number of samples. In step (10) a mean value of the read-out measured data is obtained as correction data. In step (11) the current measured data is corrected by the correction data.

In step (12) it is checked whether the corrected data is smaller than the reference value, and if so, the non-defective signal 51 is produced in step (13) and the non-defective condition is displayed on the display 64a in step (14).

When the corrected data is greater than the reference value, the defective signal 51' is produced in step (15) and the defective condition is displayed on the display 64a in step (16).

Thus one measurement cycle ends, and in step (17) it is checked whether an inspection end command is present or not, and if not, the process returns to step (3) and the inspection continues.

As described above, according to the present invention, pressure measurement error values are fetched into the RAM 58 for each temperature and the measured data thus fetched for each temperature are averaged to obtain correction data, so that even if the temperature compensation curve 65 drifts, the correction data for each temperature varies with the drift. Accordingly, since the temperature compensation curve is automatically corrected, even if the temperature of the article under inspection 20 varies, the temperature compensation can be achieved without supervision, permitting complete automation of the inspection process.

While in the foregoing the present invention has been described in connection with a differential pressure detecting type leakage inspection equipment, the invention is also applicable to leakage inspection equipment of the type that measures a positive- or negative-pressure variation in the article under inspection by means of a single pressure detector. When applying the invention to this type of leakage equipment, it is necessary only to measure ambient temperature by the temperature measuring means 35b and to select one of the storage areas A to N of the RAM 58 in accordance with the difference between the ambient temperature and the temperature of the article 20 being inspected.

Further, although in the above description measured data is stored in one of the storage areas of the RAM 58 for each temperature difference, it is also possible to employ a method that adds the temperature difference data to the measured pressure data, stores the measured pressure data added with the temperature difference data in the RAM 58 one after another, and reads them out according to the temperature difference data. With such a storage method, the RAM 58 can be handled as one storage area, and hence no empty area occurs. Accordingly, the RAM 58 can be utilized effectively.

What is claimed is:

1. Pressure variation detecting type leakage inspection equipment comprising:
   pressure measuring means for detecting a variation, in a fixed period of time, in the pressure difference between an article under inspection and a reference tank;
   an A-D converter for converting the measured pressure difference into digital pressure difference data;
   first temperature measuring means for detecting the temperature of said article under inspection;
   second temperature measuring means for detecting the temperature of said reference tank;
   temperature difference producing means for producing digital temperature difference data representative of the difference between the temperatures of said article under inspection and said reference tank;
   memory means for storing said pressure difference data in relation to said temperature difference data;
   readout means for reading out of said memory means all the pressure difference data which corresponds to the temperature difference data from said temperature difference producing means;
   calculating means for calculating a mean value of the pressure difference data read out of said memory means by said readout means;
   correcting means for subtracting the mean value obtained by said calculating means from the pressure difference data produced by said A-D converter to provide corrected data;
   judging means for comparing the corrected data from said correcting means with a reference value to judge whether said article under inspection is nondefective or defective;
   display means for displaying the results of the judgement by said judging means;
   write-in means for writing, when said article under inspection is judged to be nondefective by said judging means, the pressure difference data from said A-D converter into said memory means in relation to the corresponding temperature difference data from said temperature difference producing means; and
   control means for controlling the operations of said readout means, said write-in means, said calculating means, said correcting means, said judging means and said display means.

2. Pressure variation detecting type leakage inspection equipment according to claim 1 wherein said memory means has plural storage areas corresponding to temperature differences, said write-in means comprising means for writing said pressure difference data into the one of said storage areas of said memory means which corresponds to the temperature difference from said temperature difference producing means, and said readout means comprising means for reading out all the pressure difference data stored in said one of the storage areas corresponding to the temperature difference data provided from said temperature difference producing means.

3. Pressure variation detecting type leakage inspection equipment according to claim 1 wherein said write-in means comprises means for writing into said memory means the temperature difference data from said temperature difference producing means together with the pressure difference data, and said readout means comprises means for reading out of said memory means all the pressure difference data which accompanies the same temperature difference data that is provided from said temperature difference producing means.

4. Pressure variation detecting type leakage inspection equipment according to claim 1 wherein said memory means, said readout means, said write-in means, said correcting means, said calculating means, said judging means and said control means comprise a microcomputer.

5. Pressure variation detecting type leakage inspection equipment according to claim 1 comprising number setting means for setting therein a number up to which the pressure difference data corresponding to each of the temperature differences are to be stored in said memory means.

6. Pressure variation detecting type leakage inspection equipment according to claim 1 comprising initial value calculating means for calculating initial pressure difference values corresponding to respective temperature differences on the basis of two measured pressure difference data at different temperature differences obtained at the start of inspection.

* * * * *